(12) United States Patent
Nagura et al.

(10) Patent No.: US 7,680,576 B2
(45) Date of Patent: Mar. 16, 2010

(54) DRIVING FORCE DISTRIBUTION CONTROL DEVICE FOR VEHICLE

(75) Inventors: Tatsunori Nagura, Tokyo (JP); Takeshi Yoneda, Tokyo (JP); Yoshinobu Yamazaki, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 262 days.

(21) Appl. No.: 11/781,362

(22) Filed: Jul. 23, 2007

(65) Prior Publication Data

US 2008/0027615 A1 Jan. 31, 2008

(30) Foreign Application Priority Data

Jul. 28, 2006 (JP) ............................... 2006-206643

(51) Int. Cl.
*G06F 7/00* (2006.01)

(52) U.S. Cl. ............................... 701/69; 701/78; 701/84; 701/87; 180/197; 180/248

(58) Field of Classification Search .................... 701/69, 701/70, 71, 84, 87, 78; 180/197, 248
See application file for complete search history.

(56) References Cited

U.S. PATENT DOCUMENTS 5,014,809 A * 5/1991 Matsuda ..................... 180/248

| | | | | |
|---|---|---|---|---|
| 5,748,503 A | * | 5/1998 | Saeki et al. | 702/148 |
| 5,762,157 A | * | 6/1998 | Uehara | 180/197 |
| 6,280,008 B1 | * | 8/2001 | Yoshida | 303/155 |
| 2004/0019421 A1 | * | 1/2004 | Wakao et al. | 701/69 |

FOREIGN PATENT DOCUMENTS

| | | |
|---|---|---|
| JP | 2004-106793 A | 4/2004 |
| JP | 2005-54944 A | 3/2005 |

\* cited by examiner

*Primary Examiner*—Gertrude Arthur Jeanglaud
(74) *Attorney, Agent, or Firm*—Darby & Darby, P.C.

(57) ABSTRACT

To maintain operating safety by driving force distribution control system when an abnormal state arises and to smoothly transition from a normal state to an abnormal state without sudden changes in vehicle behavior. The driving force distribution control part calculates the transfer torque for the transfer clutch for the center differential device and the torque movement for the hydraulic motor for the rear wheel final reduction gear. When the control state detection part detects an abnormal state, there is control of the hydraulic motor in the direction that torque movement is lost on the one hand, and the transfer torque for the transfer clutch is controlled in the direction of front and rear distribution; after a preset time and after this control is carried out, the transfer torque drops.

6 Claims, 7 Drawing Sheets

DRIVING FORCE DISTRIBUTION CONTROL DEVICE FOR VEHICLE

CROSS REFERENCE TO RELATED APPLICATIONS

The disclosure of Japanese Application No. 2006-206643 filed on Jul. 28, 2006 including the specification, drawings, and abstract is incorporated herein by reference in its entirety.

BACKGROUND OF THE INVENTION

Technical Field

The present invention relates to a driving force distribution control device for a vehicle that carries out suitable control of driving force distribution between the front and rear wheels and between the left and right wheels when an abnormal state occurs.

In recent years, the transmitted torque between the front and rear wheels and the transmitted torque between the left and right wheels is actively controlled according to the driving state and operating state of a vehicle, and driving force distribution control devices that carry out optimal control of operability and the like have been developed and made practical. In these driving force distribution control devices, control has been developed and introduced for preventing the deterioration of controllability even when an abnormal state arises in the vehicle.

For example, in Japanese Unexamined Patent Application No. 2004-106793, there is disclosed a technique where the fastening power of a coupling mechanism is controlled and the transmitted torque varied. In the driving force distribution control device which distributes the driving force for the vehicle, a torque limiter that limits the coupling mechanism fastening force is continuously varied from a limiter value for a normal control state to a limiter value for a special control state that protects the driving force transmission system according to the operating state of the vehicle, and the fastening force for the coupling mechanism is controlled to a special control state limiter value or less in the special control state.

However, the technique disclosed in Japanese Unexamined Patent Application 2004-106793 described above is to the end control technology for when there is a center differential coupling mechanism that controls the front and rear driving force distribution. In cases where, besides this, there is driving force distribution control that actively controls the left and right driving force distribution, it is necessary to appropriately integrate and make variable the driving force distribution control between these front and rear wheels and driving force distribution control between the left and right wheels even during abnormalities.

The present invention came about in light of the above facts, and an innocent object thereof to provide a driving force distribution control device for the vehicle where, even when an abnormal state, such as installation of the tire with a different diameter, abnormal increases in the drive system oil temperature or the like, operating safety is preserved to the extent possible by driving force distribution control between the front and rear wheels and between the left and right wheels. In addition, there is a smooth transition without sudden vehicle behavior or the like even from the normal state to the abnormal state or returning from the abnormal state to the normal state, and the driver is not given a sense of discomfort.

SUMMARY OF THE INVENTION

The present invention has been developed in view of the aforementioned problems. It is therefore a first aspect of the present invention to provide a driving force distribution control device for a vehicle which comprises an abnormal state detection means that detects whether a vehicle is abnormal state or not; a left and right driving force distribution control means that controls the driving force distribution between the left and right wheels; a front and rear driving force distribution control means that controls the driving force distribution between the front and rear wheels; and an abnormal period control means that, when said abnormal state is detected, controls said left and right driving force distribution control means in a direction that loses torque movement between the left and right wheels, and said front and rear driving force distribution control means to vary torque transmission between the front and rear wheels.

A second aspect of the present invention according to the first aspect, when said vehicle recovers to a normal state from an abnormal state, said abnormal period control means carries out a return to normal control of said front and rear driving force distribution control means and a return to normal control of said left and right driving force distribution control means with different timings.

A third aspect of the present invention according to the second aspect, when said vehicle recovers a normal state from an abnormal state, said abnormal period control means returns said left and right driving force distribution control means to normal control after returning said front and rear driving force distribution control means to normal control.

A fourth aspect of the present invention according to the first aspect, when said vehicle is an abnormal state, said abnormal period control means controls the torque transmission between the front and rear wheels for said front and rear driving force distribution control means in the direction of front and rear or the like distribution.

A fifth aspect of the present invention according to the first aspect, when said vehicle is an abnormal state, said abnormal period control means carries out control in the direction that loses said torque transmission after controlling the torque transmission between the front and rear wheels for a preset time for said front and rear driving force distribution control means.

A sixth aspect of the present invention according to the first aspect, further comprises an antilock brake system that prevents a locked state for the wheels during braking, wherein when said antilock brake system is operating and when said vehicle state is an abnormal state, said abnormal period control means carries out control between the front and rear wheels at a preset value for said front and rear driving force distribution control means in the direction that loses torque transmission.

According to the driving force distribution control device according to the present invention, the effects are providing a driving force distribution control device for the vehicle where, even when an abnormal state, such as installation of the tire with a different diameter, abnormal increases in the drive system oil temperature or the like, operating safety is preserved to the extent possible by driving force distribution control between the front and rear wheels and between the left and right wheels, and in addition, there being a smooth transition without sudden vehicle behavior or the like even from the normal state to the abnormal state or returning from the abnormal state to the normal state, and the driver is not given a sense of discomfort.

DETAILED DESCRIPTION OF THE PREFERRED EMBODIMENT

In the following, embodiments of the present invention will be described based on the drawings.

Figure 1:
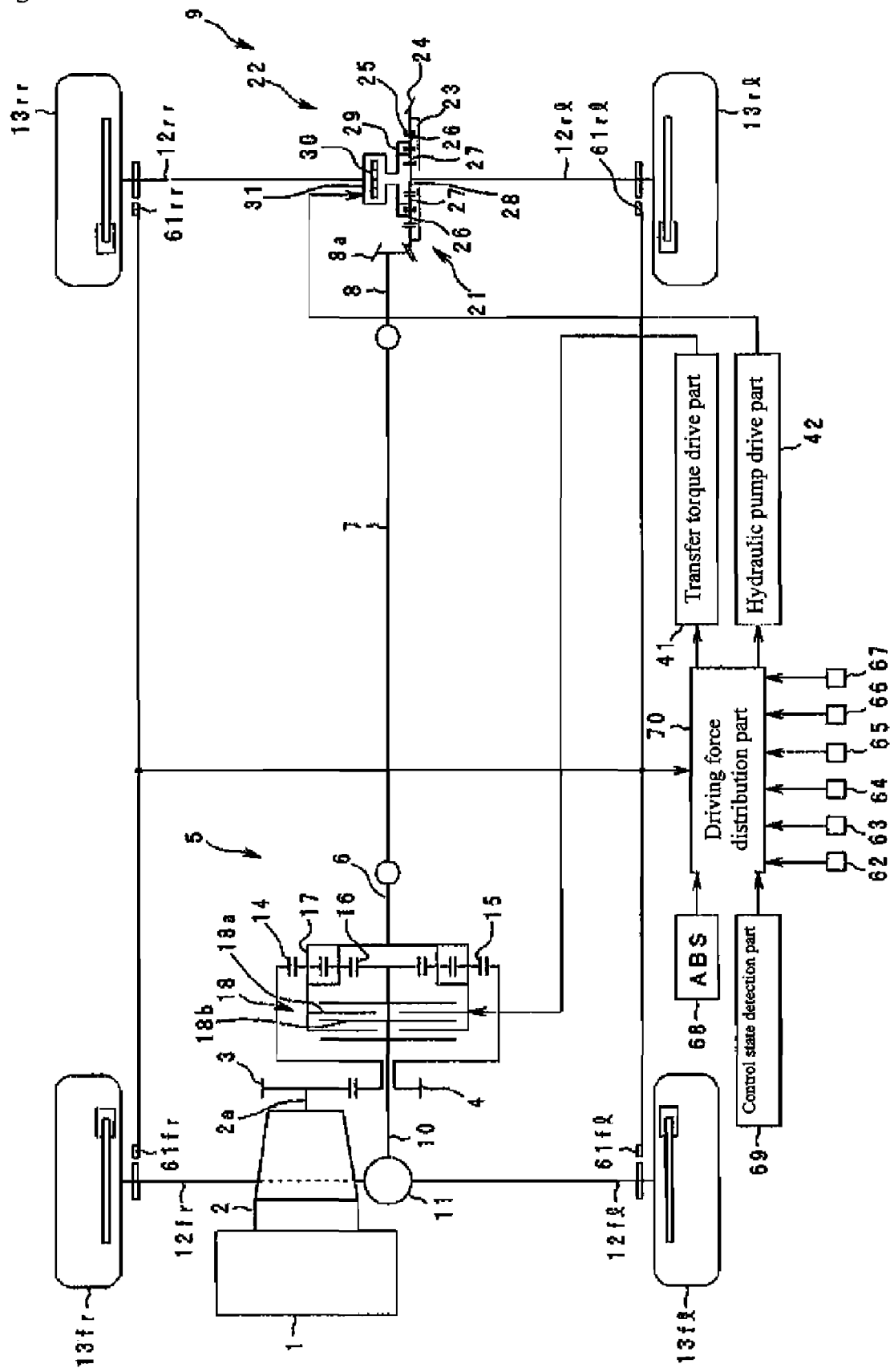
FIG. 1 is an explanatory diagram showing a schematic constitution of the entire drive system for a vehicle.
Figure 2:
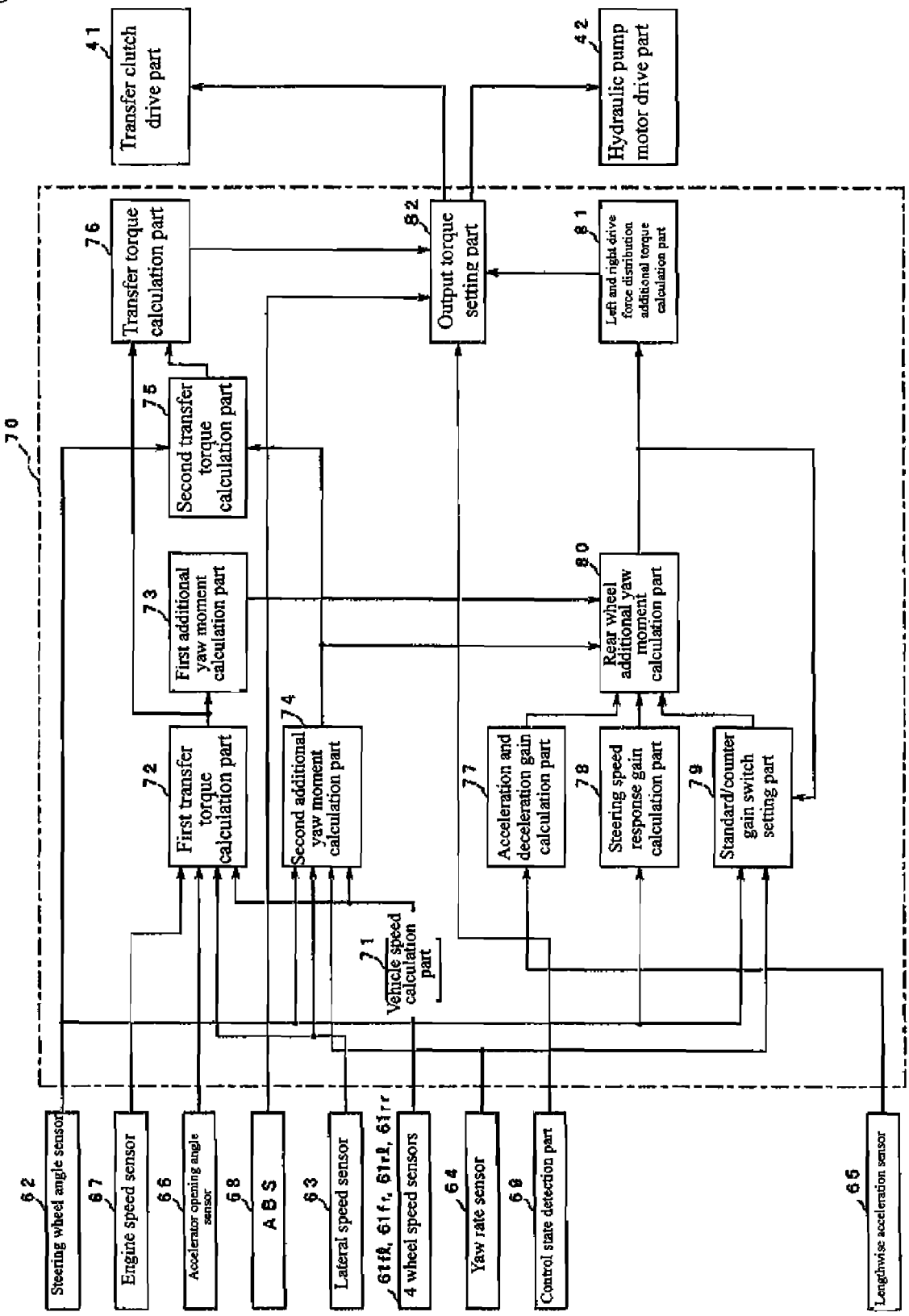
FIG. 2 is a function block diagram of the driving force distribution control part.
Figure 3:
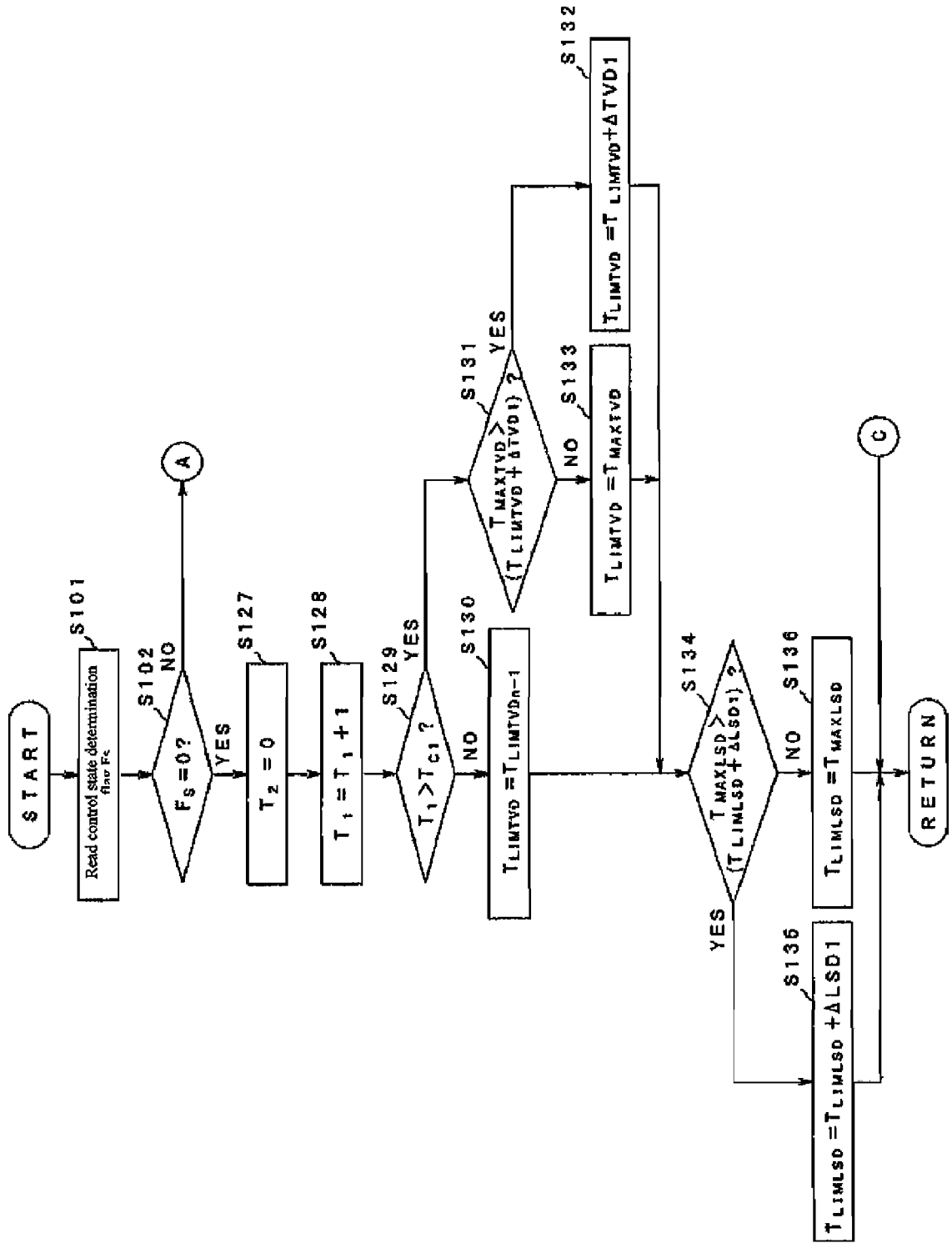
FIG. 3 is a flow chart of a torque limiter setting program.
Figure 4:
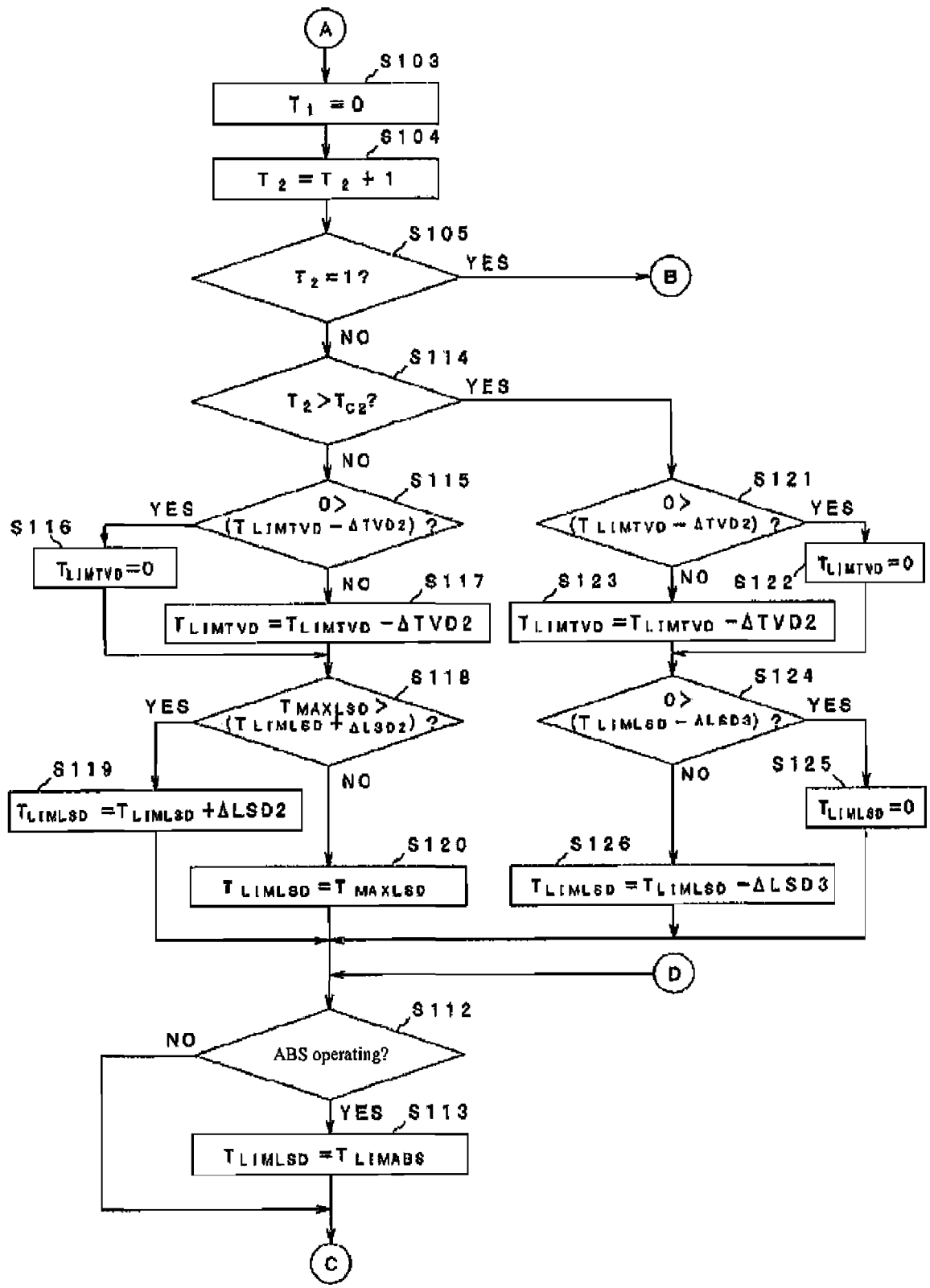
FIG. 4 is a flow chart continuing from FIG. 3.
Figure 5:
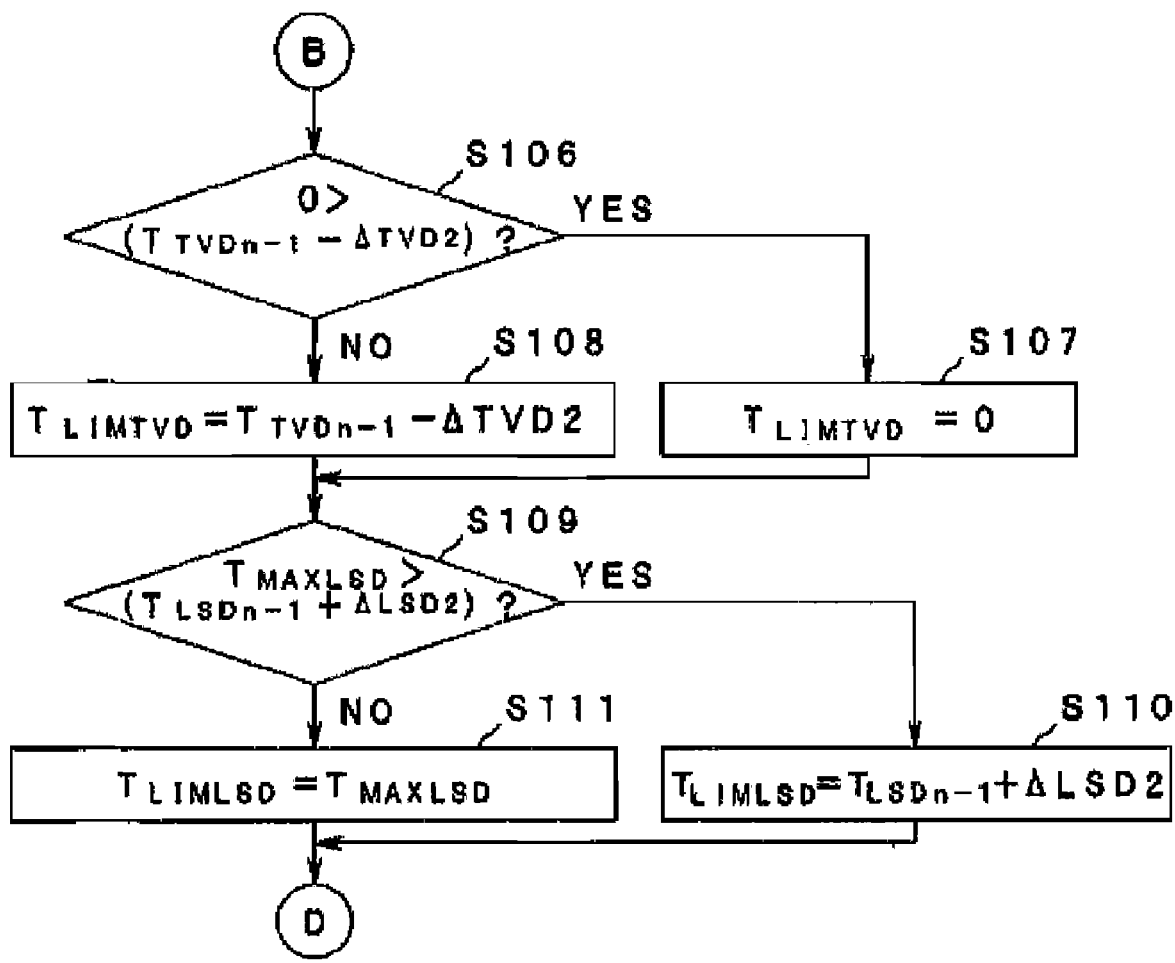
FIG. 5 is a flow chart continuing from FIG. 4.
Figure 6:
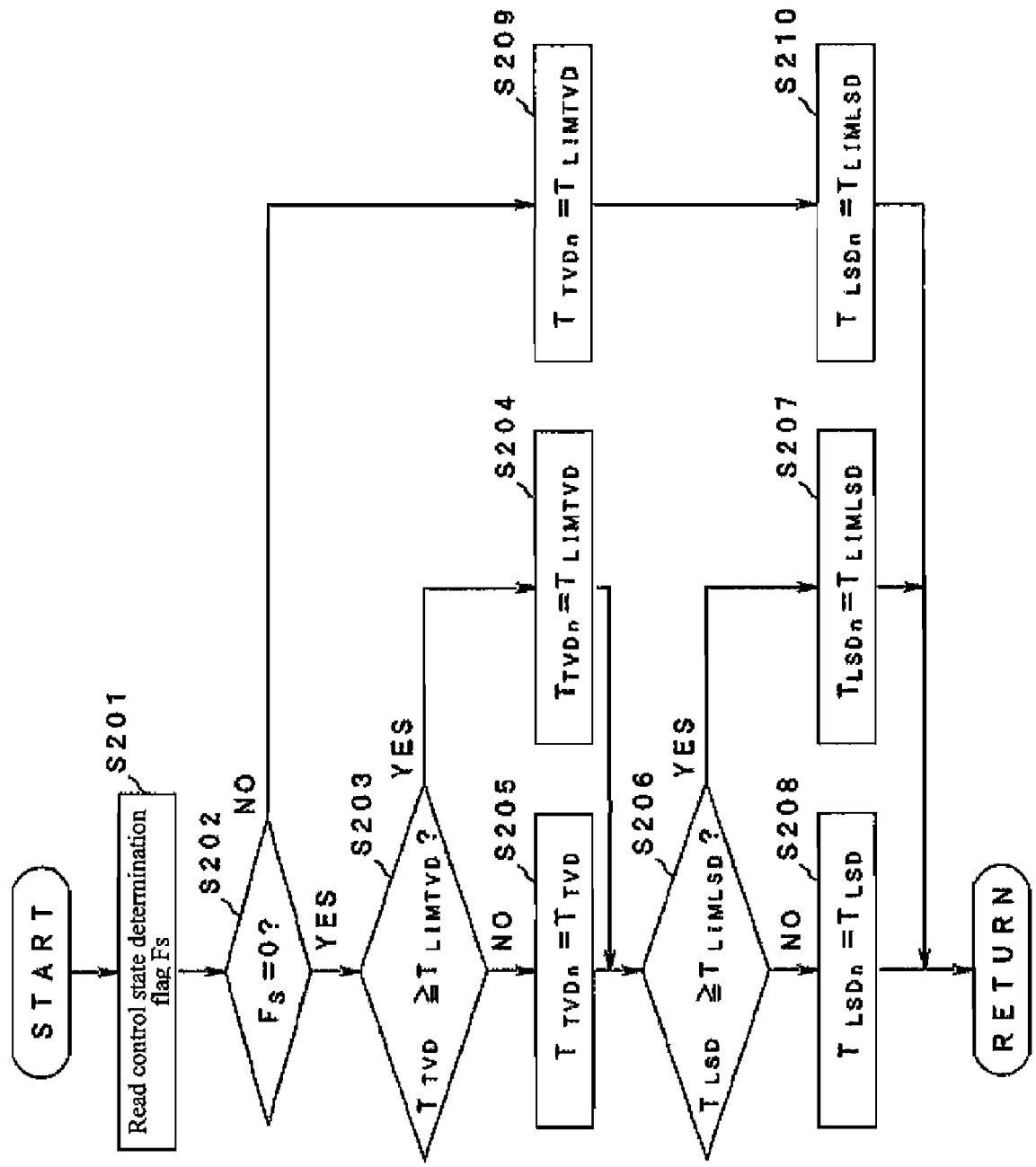
FIG. 6 is a flow chart of an output torque setting program.
Figure 7:
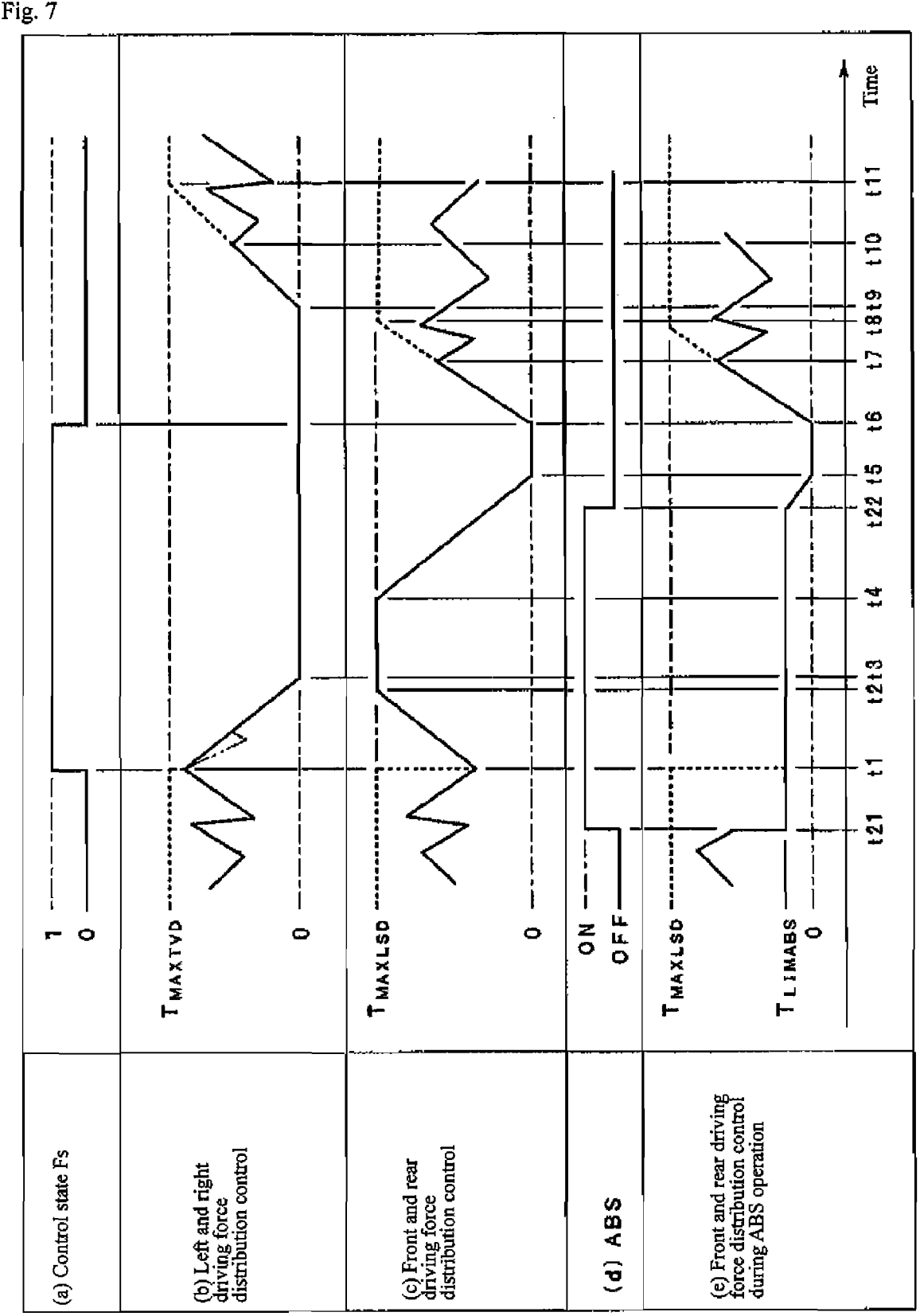
FIG. 7 is a timing chart showing an example of driving force distribution control.

FIG. 1-FIG. 7 show an embodiment of the present invention, and FIG. 1 is an explanatory diagram showing a schematic constitution of an entire drive system for a vehicle. FIG. 2 is a function block diagram of a driving force distribution control part. FIG. 3 is a flow chart for a torque limiter setting program. FIG. 4 is a flow chart continuing from FIG. 3. FIG. 5 is a flow chart continuing from FIG. 4. FIG. 6 is a flow chart for an output torque setting program. FIG. 7 is a time chart showing an example of driving force distribution control.

In FIG. 1, element 1 shows an engine disposed in the front part of a vehicle, and the driving force from this engine 1 is transferred from an automatic transmission device (shown in the diagram, including a torque converter and the like) 2 rear of the engine 1 to a center differential device 5 through a transmission output wheel 2a, a transfer drive gear 3 and a transfer driven gear 4.

While the driving force transferred to the center differential device 5 is input to a rear wheel final reduction gear 9 through a rear drive wheel 6, a propeller shaft 7 and a drive pinion wheel part 8 on the one hand, it is input to a front wheel final reduction gear 11 through a front drive wheel 10.

While the driving force input to the rear wheel final reduction gear 9 is transferred to a left rear wheel 13*rl* through a rear wheel left drive shaft 12*rl* on the one hand, it is transferred to a right rear wheel 13*rr* through a rear wheel right drive shaft 12*rr*. In addition, while the driving force input to the front wheel final reduction gear 11 is transferred to a left front wheel 13*fl* through a front wheel left drive shaft 12*fl* on the one hand, and transferred to a right front wheel 13*fr* through a front wheel left drive shaft 12*fr*.

The center differential device 5 has a constitution where a ring gear 14 is integrated with the transfer driven gear 4, and this ring gear 14 engages a double planetary gear 15. The front drive wheel 10 extends toward the rear, and passes through the center of the axis of rotation of the ring gear 14, and a sun gear 16 provided on the front drive wheel 10 engages the double planetary gear 15.

A carrier 17 that axially supports the double planetary gear 15 extends forward, and a wet multiple disc clutch (transfer clutch) 18 is disposed between the front drive wheel 10 and the carrier 17.

The transfer clutch 18 is constituted such that an outer plate 18*a* and an inner plate 18*b* are alternately placed on the inside of the carrier 17 and on the front drive wheel 10, respectively, and freely depressed by a piston that is not shown in the drawing.

This piston is provided with an electromagnet not shown in the drawing that is driven by a transfer clutch drive part 41, and the constitution is such that the depression force (transfer torque) is freely electronically controlled through the transfer clutch drive part 41 by a control signal from a driving force distribution control part 70.

The rear wheel final reduction gear 9 is constituted so as to be provided with a differential mechanism part 21 and a hydraulic motor 22 as disclosed in Published Unexamined Patent Application No. 2005-54944.

The differential mechanism part 21 is constituted by a publicly known planetary gear system, and a drive pinion 8*a* provided on the rear end of the drive pinion wheel part 8 engages a ring gear 24 provided on the periphery of a differential case 23.

A ring gear 25 provided on the inside of the differential case 23 engages an outer pinion 26, and an inner pinion 27 that engages this outer pinion 26 engages a sun gear 28 provided on the rear wheel drive shaft 12*rl*. A carrier 29 that supports the outer pinion 26 and the inner pinion 27 so as to freely rotate is coupled to the rear wheel left drive shaft 12*rr*.

Therefore, while the driving force input from the drive pinion 8*a* is transferred to the rear wheel left drive shaft 12*rl* from the sun gear 28 on the one hand, it is transferred to the rear wheel left drive shaft 12*rr* from the carrier 29.

The hydraulic motor 22 is constituted of a radial piston hydraulic motor, and a cylinder block 30 that houses a plurality of pistons (not shown in the drawing) that protrude freely toward the outer periphery is linked to the rear wheel left drive shaft 12*rl*. A motor case 31 (freely rotatable in the reverse of the cylinder block 30) is provided with a cam ring (not shown in the drawing) where the cam face is formed on the inside is linked to the rear wheel right driveshaft 12*rr*.

Furthermore, the hydraulic motor 22 operates by means of a hydraulic pump motor drive part 42 comprising a hydraulic pump, a hydraulic valve unit and the like, and the required torque is transferred from the rear wheel left drive shaft 12*rl* to the rear wheel right driveshaft 12*rr* or from the rear wheel right driveshaft 12*rr* to the rear wheel left drive shaft 12*rl*. A control signal that drives this hydraulic pump motor drive part 42 is output by the driving force distribution control part 70 which will be described later.

In the vehicle, various sensors are provided to detect the parameters necessary for the front and rear driving force distribution control and rear wheel left and right driving force distribution control implemented as described by the driving force distribution control part 70.

In other words, wheel speeds ωfl, ωfr, ωrl, ωrr for each of the wheels 13*fl*, 13*fr*, 13*rl*, 13*rr* are detected by wheel speed sensors 61*fl*, 61*fr*, 61*rl*, 61*rr*, and the steering wheel angle θH is detected by a steering wheel angle sensor 62. The lateral acceleration actually arising in the vehicle (abbreviated to actual lateral acceleration in the following) ($d^2y/dt^2$) is detected by a lateral acceleration sensor 63. The yaw rate actually arising in the vehicle (abbreviated to actual yaw rate in the following) γ is detected by a yaw rate sensor 64, and the longitudinal acceleration ($d^2x/dt^2$) is detected by a longitudinal acceleration sensor 65. The accelerator opening angle θACC is detected by an accelerator opening angle sensor 66. The engine speed NE is detected by an engine speed sensor 67 and input to the driving force distribution control part 70.

In addition, a publicly known antilock brake system (ABS) 68, which prevents a locked state of the wheels when braking, is installed, and the operating state signal from this ABS 68 is also imported to the driving force distribution control part 70.

Furthermore, there is provided a control state detection part 69 as an abnormal state detection means that detects an abnormal state in the vehicle, and the signal from this control state detection part 69 is also input to the driving force distribution control means 70.

What are detected or determined to be abnormal states by the control state detection part 69 are the various states below.

Abnormalities in various sensor and switch signals

Installation of abnormal diameter tire (determination by input signal from wheel speed sensors 61$fl$, 61$fr$, 61$rl$, 61$rr$ and the like while driving straight ahead)

Abnormal rise in drive system oil temperature

Furthermore, the driving force distribution control part 70 calculates the front and rear driving force distribution control by the transfer clutch 18 in the center differential device 5 as a transfer torque based on the various input signals described above and outputs it to the transfer clutch drive part 41.

In addition, the driving force distribution control part 70 calculates the left and right driving force distribution control by the hydraulic motor 22 in the rear wheel final reduction gear 9 as a distance and outputs it to the hydraulic pump motor drive part 42. When the control state detection part 69 has detected any abnormality in the vehicle at this time, the driving force distribution control part 70 carries out control in the direction that torque movement is lost using the hydraulic motor 22. On the other hand, the transfer torque due to the transfer clutch 18 is controlled in the direction of front and rear distribution and the like, and after a preset time that this abnormal state control has been carried out, the transfer torque is reduced. In addition, when the signal from the control state detection part 69 returns to a normal state from an abnormal state, the driving force distribution control part 70 first returns the control of the hydraulic motor 22 (left and right driving force distribution control) to normal control after returning the control of the transfer clutch 18 (front and rear driving force distribution control) to normal control. In other words, the driving force distribution control part 70 functions as a left and right driving force distribution control means, a front and rear driving force distribution control means and an abnormal period control means.

In other words, as is shown in FIG. 2, the driving force distribution control means 70 mainly comprises a vehicle speed calculation part 71, a first transfer torque calculation part 72, a first additional yaw moment calculation part 73, a second additional yaw moment calculation part 74, a second transfer torque calculation part 75, a transfer torque calculation part 76, an acceleration and deceleration gain calculation part 77, a steering speed response gain calculation part 78, a standard/counter gain switch setting part 79, a rear wheel additional yaw moment calculation part 80, a left and right driving force distribution additional torque calculation part 81 and an output torque setting part 82.

The wheel speeds $\omega fl$, $\omega fr$, $\omega rl$, $\omega rr$ for the wheel speed sensors, that is for each of the four wheels 13$fl$, 13$fr$, 13$rl$, 13$rr$, detected by wheel speed sensors 61$fl$, 61$fr$, 61$rl$, 61$rr$ are input to the vehicle acceleration calculation part 71. Furthermore, for example, the vehicle speed V $(=(\omega fl+\omega fr+\omega rl+\omega rr)/4)$ is calculated by calculating the average of these and output to the first transfer torque calculation part 72 and the second additional yaw moment calculation part 74.

The actual lateral acceleration $(d^2y/dt^2)$, the accelerator opening angle $\theta$ ACC from the accelerator opening angle sensor 66, the engine speed NE from the engine speed sensor 67 and the vehicle speed V from the vehicle speed calculation part 71 are input to the first transfer torque calculation part 72.

Furthermore, from these input signals, the first transfer torque calculation part 72 calculates the input torque response transfer torque TLSDI as a fastening torque according to the input torque from the engine, and outputs it to the first additional yaw moment calculation part 73 and the transfer torque calculation part 76.

The input torque response transfer torque TLSDI from the first transfer torque calculation part 72 is input to the first additional yaw moment calculation part 73. Furthermore, for example, the input response transfer torque TLSDI is converted to the additional torque moment (input torque response additional yaw moment M1) by the following Equation (1), and output to the rear wheel additional yaw moment calculation part 80.

$$M1 = KLSDI \cdot TLSTI \quad (1)$$

Here, KLSDI is a conversion coefficient found in advance by experiment, calculations and the like. Moreover, the input torque response transfer torque TLSDI may be converted to the input torque response additional yaw moment M1 without calculations such as Equation (1), referring to a preset map or the like.

The steering wheel angle $\theta$H from the steering wheel angle sensor 62, the actual lateral acceleration $(d^2y/dt^2)$ from the lateral acceleration sensor 63, the actual yaw rate $\gamma$ from the yaw rate sensor 64 and the vehicle speed V from the vehicle speed calculation part 71 are input to the second additional yaw moment calculation part 74. Furthermore, the second additional yaw moment calculation part 74 estimates to the yaw moment (steering angle/yaw a rate response additional yaw moment M2) added to the vehicle, and outputs to the second transfer torque calculation part 75 and the rear wheel additional yaw moment calculation part 80.

The steering wheel angle $\theta$H from the steering wheel angle sensor 62 and the steering angle/yaw a rate response additional yaw moment M2 from the second additional yaw moment calculation part 74 are input to the second transfer torque calculation part 75.

Furthermore, the steering/yaw rate response transfer torque TLSDP is calculated by Equation (2) or (3) below, and output to the transfer torque calculation part 76.

When $\theta \geq 0$ $$TLSDP = -KLSDP \cdot M2 \quad (2)$$

When $\theta < 0$ $$TLSDP = KLSDP \cdot M2 \quad (3)$$

Here, KLSDP is a conversion coefficient.

The input torque response transfer torque TLSDI from the first transfer torque calculation part 72 is input to the transfer torque calculation part 76, and the steering angle/yaw response transfer torque TLSDP is input from the second transfer torque calculation part 75. Furthermore, the transfer torque TLSD is calculated from Equation (4) below, and output to the output torque setting part 82.

$$TLSD = TLSDI + TLSDP \quad (4)$$

The longitudinal acceleration $(d^2x/dt^2)$ from the longitudinal acceleration sensor 65 is input to the acceleration and deceleration gain calculation part 77. Furthermore, the acceleration and deceleration gain Ggx is set with reference to a preset map and output to the rear wheel additional yaw moment calculation part 80. This acceleration and deceleration gain Ggx is set to be large during acceleration and set to be small during deceleration.

The steering wheel angle θH from the steering wheel angle sensor 62 is input to the steering speed response gain calculation part 78. Furthermore, the steering speed response gain Ggh is set with reference to a preset map, and output to the rear wheel additional yaw moment calculation part 80. This steering speed response gain Ggh is set larger as the absolute value for the steering wheel angular speed (dθH/dt) increases.

The steering angle θH from the steering angle sensor 62 is input to the standard/counter gain switch setting part 79, and the actual yaw rate γ is input from the yaw rate sensor 64. The rear wheel additional yaw moment Mr is input from the rear wheel additional yaw moment calculation part 80. Furthermore, gain switching is carried out to handle special cases where counter steering is carried out, and this gain (standard/counter gain Gc) is output to the rear wheel additional yaw moment calculation part 80. Specifically, when θH>0, and Mr>0, and γ<0, and when θH<0, and Mr<0, and γ>0, the standard/counter gain Gc is set to a value larger (for example, 5.0) than the standard value (for example, 1.0), and in standard cases other than that described above, the standard/counter gain Gc is set to the standard value.

The input torque response additional yaw moment M1 from the first additional yaw moment calculation part 73 is input to the rear wheel additional yaw moment calculation part 80, and the steering angle/yaw a rate response additional yaw moment M2 is input from the second additional yaw moment calculation part 74. The acceleration and deceleration gain Ggx from the acceleration and deceleration gain calculation part 77 is input, and the steering speed response gain Ggh from the steering speed response gain calculation part 78 is input. The standard/counter gain Gc from the standard/counter gain switch setting part 79 is input.

Furthermore, the rear wheel additional yaw moment Mr generated by the rear wheel final reduction gear 9 is calculated by Equation (5) below and output to the standard/counter gain switch setting part 79 and the left and right driving force distribution additional torque calculation part 81

$$Mr = Gc(Ggx \cdot M1 + Gdh \cdot M2) \quad (5)$$

The rear wheel additional yaw moment Mr from the rear wheel additional yaw moment calculation part 80 is input to the left and right driving force distribution additional torque calculation part 81.

Furthermore, for example, a torque movement TTVD generated by the hydraulic motor 22 is calculated by Equation (6) below and output to the output torque setting part 82, and as will be described later, the final transfer torque (transfer torque for this increment) TTDVn that is set by this output torque setting part 82 is output to the hydraulic pump motor drive part 42.

$$TTVD = Mr/(Rt \cdot (Lbr/2)) \quad (6)$$

Here, Lbr is the rear tread.

A signal from the ABS 68 showing the operating state of the ABS, a detection signal for abnormal states from the control state detection part 69, the transfer torque TLSD from the transfer torque calculation part 76 and the torque movement TTVD from the left and right driving force distribution additional torque calculation part 81 are input to the output torque setting part 82.

Furthermore, a limit to value (LSD limit value) TLIMLSD for the transfer torque TLSD and a limit value (TVD limit value) TLIMTVD for the torque movement TTVD are set according to the torque limiter setting program, which will be described later. Using these limit values, TLIMLSD and TLIMTVD, that have been set, the final transfer torque (transfer torque for this increment) TLSDn and the final moving torque (moving torque for this increment) TTVDn are set according to the output torque setting program that will be described later and are output to the transfer a clutch drive part 41 and the hydraulic pump motor drive part 42, respectively.

In addition, when the ABS 68 is operating, the output torque setting part 82 sets a small value (for example, a value for a state where the transfer clutch 18 is substantially released) that is preset for the ABS operating time as that final transfer torque TLSDn, and outputs it to the transfer clutch drive part 41.

Next, the torque limiter is setting program that is run by the output torque setting part 82 will be described based on the flowchart in FIG. 3-FIG. 5. Moreover, the maximum permissible torque value TMAXLSD, which is the maximum value for the transfer torque TLSD, in the initial value for the LSD limit value TLIMLSD, and the maximum permissible torque value TMAXTVD, which is the maximum value for the moving torque TTVD, in the initial value for the TVD limit value TLIMTVD are set.

First of all, in Step (abbreviated to "S" in the following) 101, a control state determination flag Fs is read. This control state determination flag Fs is set by a signal from the control state detection part 69, and it is set (Fs=1) when an abnormal state is detected by the control state detection part 69. It is a flag that is cleared in states other than abnormal ones (normal state), (Fs=0).

Next, moving to S102, a determination is made as to whether the control state determination flag Fs is in a cleared state or not, that is, a determination of there being a normal state or not is made. When there is an abnormal state (when Fs=1), it moves to a processing in S103-S126, and when there is a normal state (when Fs=0) to S127-S136.

Here, the case when an abnormal state is detected will be described first. When the determination results from S102 are an abnormal state with Fs=1, it moves to S103, and a first timer T1 is cleared (T1=0). It moves to S104, and a second timer T2 is incremented (T2=T2+1). It moves to S105.

Here, the first timer T1 is a timer that stays cleared in an abnormal state and is a timer that is incremented in a normal state. Conversely, the second timer T2 is a timer that stays cleared in a normal state and is a timer that is incremented in an abnormal state.

In S105, a determination as to whether the second timer T2 is 1 or not, that is, whether it is the first increment of an abnormal state or not, and when it is the first increment (when T2=1), it moves to the processing in S106-S113, and when it is other than the first increment (when T2≠1), it moves to the processing in S114-S126.

When the results of the S105 determination are the initial increment of an abnormal state and it moves to S106, whether or not the value where a constant ΔTVD2 is subtracted from the moving torque TTVDn-1 set in the previous increment (TTVDn-1-ΔTVD2) is 0 or not is determined, and when it is smaller than 0, it moves to S107, and the TVD limit value TLIMTVD is set to 0. Conversely, when it is 0 or greater, it moves to S108, and (TTVDn-1-ΔTVD2) is set as the TVD limit value TLIMTVD.

After the TVD limit the value TLIMTVD has been set in S107 or S108, it moves to S109, and the maximum permissible torque value TMAXLSD, which is the maximum value for the transfer torque TLSD that is added, and a value where the constant ΔLSD2 is added to the transfer torque TLSDn-1 set in the previous increment (TLSDn-1+ΔLSD2) are compared.

If in the results of this comparison, (TLSDn-1+ΔLSD2) is smaller than the maximum permissible torque value TMAXLSD, it moves to S110, and (TLSDn-1+ΔLSD2) is set in the LSD limit value TLIMLSD. Conversely, when (TLSDn-1+ΔLSD2) is equal to or greater than the maximum permissible torque value TMAXLSD, it moves to S111, and the maximum permissible torque value TMAXLSD is set in the LSD limit value TLIMLSD.

After the LSD limit value TLIMLSD has been set in S110 or S111, it moves to S112 and determines whether or not the ABS is in operation. Furthermore, when the ABS is in operation, it moves to S113, and the LSD limit value TLIMLSD is reset to the small value (for example, a value that puts the transfer clutch 18 in an open state) TLIMABS that is preset for use when the ABS is operating, and the program is exited. In addition, when the ABS is not operating, the program opens without any changes.

In other words, when there is an abnormal state, and the TVD limit value TLIMTVD and the LSD limit value TLIMLSD are set to the moving torque TTVDn-1 set in the previous increment and the transfer torque TLSDn-1 set in the previous increment for their initial values, and the settings are carried out with this value as the reference.

In addition, by setting the LSD limit value TLIMLSD to a small value as described above when the ABS is operating, transfer of unnecessary torque between the front and rear wheels is prevented, and the lock state for the wheels is assuredly prevented.

On the other hand, in S105 described previously, T2≠1, and when it is determined that it is not the initial increment for an abnormal state, it moves to S114, and whether or not the count value for the second timer T2 is greater then a preset threshold value Tc2 or not is determined.

If the S114 result is that the count value for the second timer T2 has not reached the threshold value Tc2, it moves to S115 and determines whether or not the value where the constant ΔTVD2 is subtracted from the TVD limit value TLIMTVD (TLIMTVD−ΔTVD2) is smaller than 0. When it is smaller than 0, it moves to S116, and the TVD limit value TLIMTVD is set to 0. Conversely, when it is 0 or greater, it moves to S117, and (TLIMTVD−ΔTVD2) is set as the TVD limit value TLIMTVD.

After TVD limit value TLIMTVD has been set in S116 or S117, it moves to S118 and the maximum permissible torque TMAXLSD and the value where the constant ΔLST2 is added to the LSD limit value TLIMLSD (TLIMLSD+ΔLSD2) are compared.

If in the results of this comparison, (TLIMLSD+ΔLSD2) is smaller than the maximum permissible torque value TMAXLSD, it moves to S119, and (TLIMLSD+ΔLSD2) is set in the LSD limit value TLIMLSD. Conversely, when (TLIMLSD+ΔLSD2) is equal to or greater than the maximum permissible torque value TMAXLSD, it moves to S120, and the maximum permissible torque value TMAXLSD is set in the LSD limit value TLTMLSD.

After the LSD limit value TLIMLSD has been set in S119 or S120, it moves to S112 and determines whether or not the ABS is in operation. Furthermore, when the ABS is in operation, it moves to S113, and the LSD limit value TLIMLSD is reset to the small value (for example, a value that puts the transfer clutch 18 in an open state) TLIMABS that is preset for use when the ABS is operating, and the program is exited. In addition, when the ABS is not operating, the program opens without any changes.

If in S114 the count value for the second timer T2 is larger than the threshold value Tc2, it moves to S121 and determines whether or not the value where the constant ΔTVD2 is subtracted from the TVD limit value TLIMTVD (TLIMTVD−ΔTVD2) is smaller than 0. When it is smaller than 0, it moves to S122, and the TVD limit value TLIMTVD is set to 0. Conversely, when it is 0 or greater, it moves to S123, and (TLIMTVD−ΔTVD2) is set as the TVD limit value TLIMTVD.

After the TVD limit value TLIMTVD is set in S122 or S123, it moves to S124, and 0 and the value where a constant ΔLSD3 is subtracted from the LSD limit value TLIMLSD (TLIMLSD−ΔLSD3) are compared.

If, as a result of this comparison, (TLIMLSD−ΔLSD3) is smaller than 0, it moves to as 125, and the LSD limit value TLIMLSD is set to 0. Conversely, when (TLIMTVD−ΔTVD3) is 0 or greater, it moves to S126, and (TLIMTVD−ΔTVD3) is set in the TVD limit value TLIMTVD.

After the LSD limit value TLIMLSD has been set in S125 or S126, it moves to S112 and determines whether or not the ABS is in operation. Furthermore, when the ABS is in operation, it moves to S113, and the LSD limit value TLIMLSD is reset to the small value (for example, a value that puts the transfer clutch 18 in an open state) TLIMABS that is preset for use when the ABS is operating, and the program is exited. In addition, when the ABS is not operating, the program opens without any changes.

In other words, an increase in temperature in drive system (specifically, the rear wheel final reduction gear 9) in an abnormal state is prevented by reducing the LSD limit value TLIMLSD at a preset time (T2>Tc2).

On the other hand, if the normal state (Fs=0) is determined in S102, it moves to S127. The second timer T2 is cleared (T2=0), and it moves to S128. The first timer T1 is incremented (T1=T1+1), and it moves to S129.

Whether or not the count value for the first timer T1 is larger than a preset threshold value Tc1 is determined in S129.

If the first timer T1 count value has not reached the threshold value Tc1 in the results of this S129 determination, it moves to S130; the TVD limit value TLIMTVDn-1 that was set in the previous increment is set as is as the TVD limit value this time, and it moves to S134.

On the other hand, if the first timer T1 count value has reached the threshold value Tc1 in the determination results for S129, it moves to S131; the maximum permissible torque value TMAXDVD, which is the maximum value for the moving torque TTVD, and a value where a constant ΔTVD1 is added to the TVD limit value TLIMTVD (TLIMTVD+ΔTVD1) are compared.

If (TLIMTVD+ΔTVD1) is smaller than the maximum permissible torque TMAXTVD in the results of this comparison, it moves to S132; (TLIMTVD+ΔTVD1) is set in the TVD limit value TLIMTVD, and it moves to S134. Conversely, when (TLIMTVD+ΔTVD1) is equal to or greater than the maximum permissible torque TMAXTVD, it moves to S133; the maximum permissible torque TMAXTVD is set in the TVD limit value TLIMTVD, and it moves to S134.

In S134, the maximum permissible torque TMAXLSD and the value where a constant ΔLSD1 is added to the LSD limit value TLIMLSD(TLIMLSD+ΔLSD1) are compared.

If, in the results of this comparison, (TLIMLSD+ΔLSD1) is smaller than the maximum permissible torque value TMAXLSD, it moves to S135; (TLIMLSD+ΔLSD1) is set in the LSD limit value TLIMLSD, and the program is exited. Conversely, when (TLIMLSD+ΔLSD1) is equal to or greater than the maximum permissible torque value TMAXLSD, it moves to S136; the maximum permissible torque value TMAXLSD is set in the LSD limit value TLTMLSD, and the program is exited.

In other words, after a return to the normal state, the front and rear driving force distribution control is first returned to the normal state, and afterwards (after the first timer T1 has reached the threshold value Tc1), the left and right driving force distribution control is returned to the normal state. This is so that sudden fluctuations in the vehicle are suppressed and the return to normal control is smoothed out by returning the left and right driving force distribution control after returning the forward and rear driving force distribution control, which has a smaller effect on the vehicle behavior than the left and right driving force distribution control, to normal control.

Moreover, the constants that increase or decrease the various limit values used in the torque limit setting program described above may be set as desired. In addition, a sufficient time is set for the threshold value Tc1 from the return to the normal state when the LSD limit value TLIMLSD is made the maximum permissible torque value TMAXLSD, but it is not limited to this, and the threshold value Tc1 may be set to a time that a shorter than that if the TVD limit value is gradually increased after the LSD limit value TLIMLSD has been increased to a certain extent.

Next, and output torque program run by the output torque setting part 82 will be described using the flowchart in FIG. 6. First of all, the control state determination flag Fs is read in S201.

Next, moving to S202, a determination is made as to whether the control state determination flag Fs is in a cleared state or not, that is, a determination of there being a normal state or not is made. When there is a normal state (when Fs=0), it moves to the processing in S202-S208, and when there is an abnormal state (when Fs=1) to the processing in S209-S210.

If a normal state is determined in the S202 determination results and it moves to S203, the torque movement TTVD from the left and right driving force distribution additional torque calculation part 81 and the TVD limit value TLIMTVD are compared; when the torque movement TTVD is greater than or equal to the TVD limit value TLIMTVD, it moves to S204, and the TVD limit value TLIMTVD is set as the moving torque TTVDn for this increment.

Conversely, if the torque movement TTVD is smaller than the TVD limit value TLIMTVD, it moves to S205, and the torque movement TTVD is set as the moving torque TTVDn.

After the moving torque TTVDn for this increment is set in S204 or S205, it moves to S206, and the transfer torque TLSD from the transfer torque calculation part 76 is compared with the LSD limit value TLIMLSD. When the transfer torque TLSD is greater than or equal to the LSD limit value TLIMLSD, it moves to S207; the LSD limit value TLIMLSD is set as the transfer torque TLSDn for this increment, and the program is exited.

Conversely, if the transfer torque TLSD is smaller than the LSD limit value TLIMLSD, it moves to S208; the transfer torque TLSD is set as the transfer torque TLSDn for this increment, and the program is exited.

On the other hand, if an abnormal state is determined in S202 described above, it moves to S209, and the TVD limit value TLIMTVD is set as the moving torque TTVDn for this increment. It moves to S210; the LSD limit value TLIMLSD is set as the transfer torque TLSDn for this increment, and the program is exited.

In other words, in an abnormal state, the transfer torque TLSDn for this increment output to the transfer torque clutch drive part 41 from the output torque setting part 82 is the LSD limit value TLIMLSD. The moving torque TTVDn for this increment that is output to the hydraulic pump motor drive part 42 from the output torque setting part 82 is the TVD limit value TLIMTVD. At this time, the moving torque TTVDn may be set to a value lower than the TVD limit value TLIMTVD for the left and right driving force distribution.

Next, an example of the transfer torque TLSDn for this increment, the LSD limit value TLIMLSD, the moving torque TTVDn for this increment and the TVD limit value TLIMTVD set by the output torque setting part 82 will be described using the time chart in FIG. 7.

First of all, if an abnormal state comes about from a normal state at time t1, the TVD limit value TLIMTVD (shown by the dashed line in the figure) is set to the value where ΔTVD2 is subtracted from the moving torque TTVDn-1 (shown by the solid line in the figure) for the previous increment, as shown in FIG. 7(b).

Likewise, as is shown in FIG. 7(c), the LSD limit value TLIMLSD (shown by the dashed line in the figure) is set to the value where ΔLSD2 is added to the transfer torque TLSDn-1 for the previous increment.

Subsequently, as is shown in FIG. 7(b), the TVD limit value TLIMTVD and the moving torque TTVDn for this increment are set to the same value and gradually decreased until they become 0 at time t3. Therefore, disturbances in the vehicle behavior because of changes in the left and right driving force distribution control are suppressed when going from a normal state to an abnormal state, and no sense of discomfort arises for the driver. Moreover, in left and right driving force distribution control, as is shown by the dot and dash line in FIG. 7(b), the moving torque TTVDn for this increment may be controlled to be equal to or less than the TVD limit value TLIMTVD.

In addition, as is shown in FIG. 7(c), the LSD limit value TLIMLSD and the transfer torque TLSDn for this increment are set as the same value, and gradually increased to become the maximum permissible torque TMAXLSD at time t2. Therefore, disturbances in the vehicle behavior because of changes in the forward and rear driving force distribution control are suppressed when going from a normal state to an abnormal state, and no sense of discomfort arises for the driver.

Subsequently, when FIG. 7 comes to time t4 as is shown in FIG. 7(c), the second timer T2 exceeds Tc2, so values for the LSD limit value TLIMLSD and the transfer torque TLSDn for this increment are gradually reduced to 0 at the time t5. Therefore, in front and rear driving force distribution control in an abnormal state, temperature increases in the drive system (specifically, the rear wheel final reduction gear 9) are assuredly prevented.

Subsequently, when there is a return to the normal state from the abnormal state at time t6, as is shown in the FIG. 7(c), the front and rear driving force distribution control is returned to a normal state first. In other words, the LSD limit value TLIMLSD and the transfer torque TLSDn for this increment are gradually increased, and in the case of this FIG. 7(c), the transfer torque TLSDn for this increment becomes a value that is smaller than the LSD limit value TLIMLSD at time t7.

The LSD limit value TLIMLSD is gradually increased to the maximum permissible torque TMAXLSD next. Furthermore, the transfer torque TLSDn for this increment is set in a range at or below the LSD limit value TLIMLSD and output.

On the other hand, after the front and rear driving force distribution control returns to the normal state as is shown in FIG. 7(b), the left and right driving force distribution control returns to the normal state (after the first timer T1 reaches the threshold value Tc1). In other words, the TVD limit value TLIMTVD and the moving torque TTVDn for this increment gradually increase starting at time t9, and in the case of this FIG. 7 (b), the moving torque TTVDn for this increment is a value that is smaller than the TVD limit value TLIMTVD at time t10. The TVD limit value TLIMDVD is gradually increased to the maximum permissible torque TMAXTVD next. Furthermore, the moving torque TTVDn for this increment is set in the range at or below the TVD limit value TLIMTVD and output.

Thus, since the front and rear driving force distribution control is first returned to the normal state, and afterwards, the left and right driving force distribution control is returned to the normal state, the left and right driving force distribution control may be returned after the front and rear driving force distribution control, which has a smaller effect on the vehicle behavior than the left and right driving force distribution control; sudden changes in the vehicle are suppressed and the return to the normal control may be made smooth.

In addition, since the return of front and rear driving force distribution control and left and right driving force distribution control is carried out smoothly, and disturbances to the vehicle behavior by these control changes are suppressed, no feeling of discomfort arises for the driver.

Next, an example for a case where the ABS is operating will be described.

If the ABS is operated at time t21 in a normal state, a preset small value (for example, a value that puts the transfer clutch 18 in an open state) is set for the transfer torque TLSDn for this increment by the transfer torque calculation part 76 and is output to the output torque setting part 82.

Subsequently, while the LSD limit value TLIMLSD takes the value described using FIG. 7(c) during the calculations if going from the normal state to an abnormal state at time t1, it is in the end reset to the preset small value (for example, a value that puts the transfer clutch 18 in an open state) TLIMABS. The LSD limit value TLIMLSD and the transfer torque TLSDn for this increment are set to the same value.

Furthermore, if the ABS operation is released at time t22, the LSD limit value TLIMLSD and the transfer torque TLSDn for this increment return to the values described using FIG. 7(c) above and are set.

Therefore, by setting the LSD limit value TLIMLSD to a small value as described above when the ABS is operating, transfer of unnecessary torque between the front and rear wheels is prevented, and the lock state for the wheels is assuredly prevented. Moreover, for left and right driving force distribution control there are no changes for ABS operation.

As per the above, according to the embodiment of the present invention, operational safety is assured to limit possible by driving force distribution control between the front and rear wheels and the left and right wheels even when an abnormal state such as input signal failure from sensors, installation of different diameter tires and abnormal increases in drive system oil temperature arises.

In addition, even in moving from a normal state to an abnormal state or returning from an abnormal state to a normal state, transitions are made without sudden changes and the like in the vehicle behavior, and feelings of discomfort for the driver may be prevented.

Moreover, in the embodiment of the present invention, an example of torque distribution to the front and rear wheels from the center deferential device 4 for the front and rear driving force distribution was described, but it is not limited to this, and for example, it goes without saying that it may be applied to a four-wheel drive vehicle with no center deferential device.

In addition, the left and right driving force distribution is not limited to one using a hydraulic motor 22, and for example, it may be applied to a mechanism that varies the torque distribution using a gear mechanism and a hydraulic multi-plate clutch.

What is claimed is:

1. A driving force distribution control device for a vehicle comprising:
   an abnormal state detection part that detects whether a vehicle is abnormal state or not;
   a left and right driving force distribution control part that controls the driving force distribution between the left and right wheels;
   a front and rear driving force distribution control part that controls the driving force distribution between the front and rear wheels; and
   an abnormal period control part that, when said abnormal state is detected, controls said left and right driving force distribution control part to decrease torque movement between the left and right wheels, and controls said front and rear driving force distribution control part to vary torque transmission between the front and rear wheels.

2. The driving force distribution control device for a vehicle according to claim 1 wherein,
   when said vehicle recovers to a normal state from an abnormal state, said abnormal period control part carries out a return to normal control of said front and rear driving force distribution control part and a return to normal control of said left and right driving force distribution control part with different timings.

3. The driving force distribution control device for a vehicle according to claim 2 wherein,
   when said vehicle recovers a normal state from an abnormal state, said abnormal period control part returns said left and right driving force distribution control part to normal control after returning said front and rear driving force distribution control part to normal control.

4. The driving force distribution control device for a vehicle according to claim 1 wherein,
   when said vehicle is an abnormal state, said abnormal period control part controls the torque transmission between the front and rear wheels for said front and rear driving force distribution control part.

5. The driving force distribution control device for a vehicle according to claim 1 wherein,
   when said vehicle is an abnormal state, said abnormal period control part carries out control to decrease said torque transmission after controlling the torque transmission between the front and rear wheels for a preset time for said front and rear driving force distribution control part.

6. The driving force distribution control device for a vehicle according to claim 1 further comprising;
   an antilock brake system that prevents a locked state for the wheels during braking,
   wherein when said antilock brake system is operating and when said vehicle state is an abnormal state, said abnormal period control part carries out control between the front and rear wheels at a preset value for said front and rear driving force distribution control part that decreases torque transmission.

* * * * *